(12) United States Patent
Carrillo

(10) Patent No.: US 8,984,306 B2
(45) Date of Patent: Mar. 17, 2015

(54) METHOD FOR ORGANISING AN ELECTRIC NETWORK INCLUDING A PLURALITY OF GENERATORS, DISTRIBUTION BLOCK AND EQUIPMENT

(75) Inventor: Jean-Jacques Carrillo, Montauban (FR)

(73) Assignees: Jean-Jacques Carrillo, Montauban (FR); Novatec SA, Montauban (FR)

( * ) Notice: Subject to any disclaimer, the term of this patent is extended or adjusted under 35 U.S.C. 154(b) by 991 days.

(21) Appl. No.: 13/121,783

(22) PCT Filed: Oct. 1, 2009

(86) PCT No.: PCT/FR2009/001172
§ 371 (c)(1),
(2), (4) Date: Oct. 13, 2011

(87) PCT Pub. No.: WO2010/037934
PCT Pub. Date: Apr. 8, 2010

(65) Prior Publication Data
US 2012/0036374 A1  Feb. 9, 2012

(30) Foreign Application Priority Data

Oct. 1, 2008  (FR) ...................................... 08 05435

(51) Int. Cl.
| | |
|---|---|
| G06F 1/26 | (2006.01) |
| G06F 11/30 | (2006.01) |
| H02J 4/00 | (2006.01) |
| H02J 3/00 | (2006.01) |

(52) U.S. Cl.
CPC ... H02J 4/00 (2013.01); *H02J 3/006* (2013.01)
USPC ............ 713/300; 713/330; 713/340; 714/14; 714/22

(58) Field of Classification Search
USPC ........................ 713/300, 330, 340; 714/14, 22
See application file for complete search history.

(56) References Cited

U.S. PATENT DOCUMENTS 6,345,309 B2 *   2/2002   Ohsawa et al. ............... 709/250
2002/0128759 A1*  9/2002   Sodoski et al. ................. 701/36

* cited by examiner

*Primary Examiner* — Michael J Brown
(74) *Attorney, Agent, or Firm* — Young & Thompson

(57) ABSTRACT

A method for the equal distribution of electric subnetworks among independent generators regardless of the number and availability of the generators in order to ensure power supply to all the subnetworks.

11 Claims, 6 Drawing Sheets

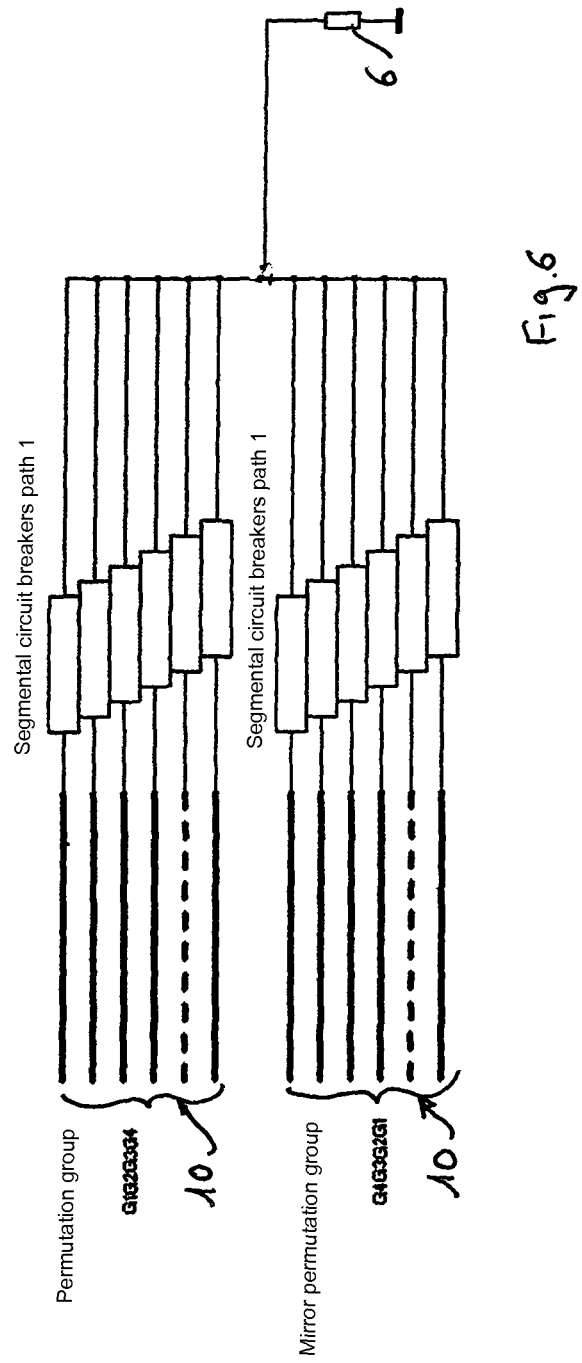

Figure 1:
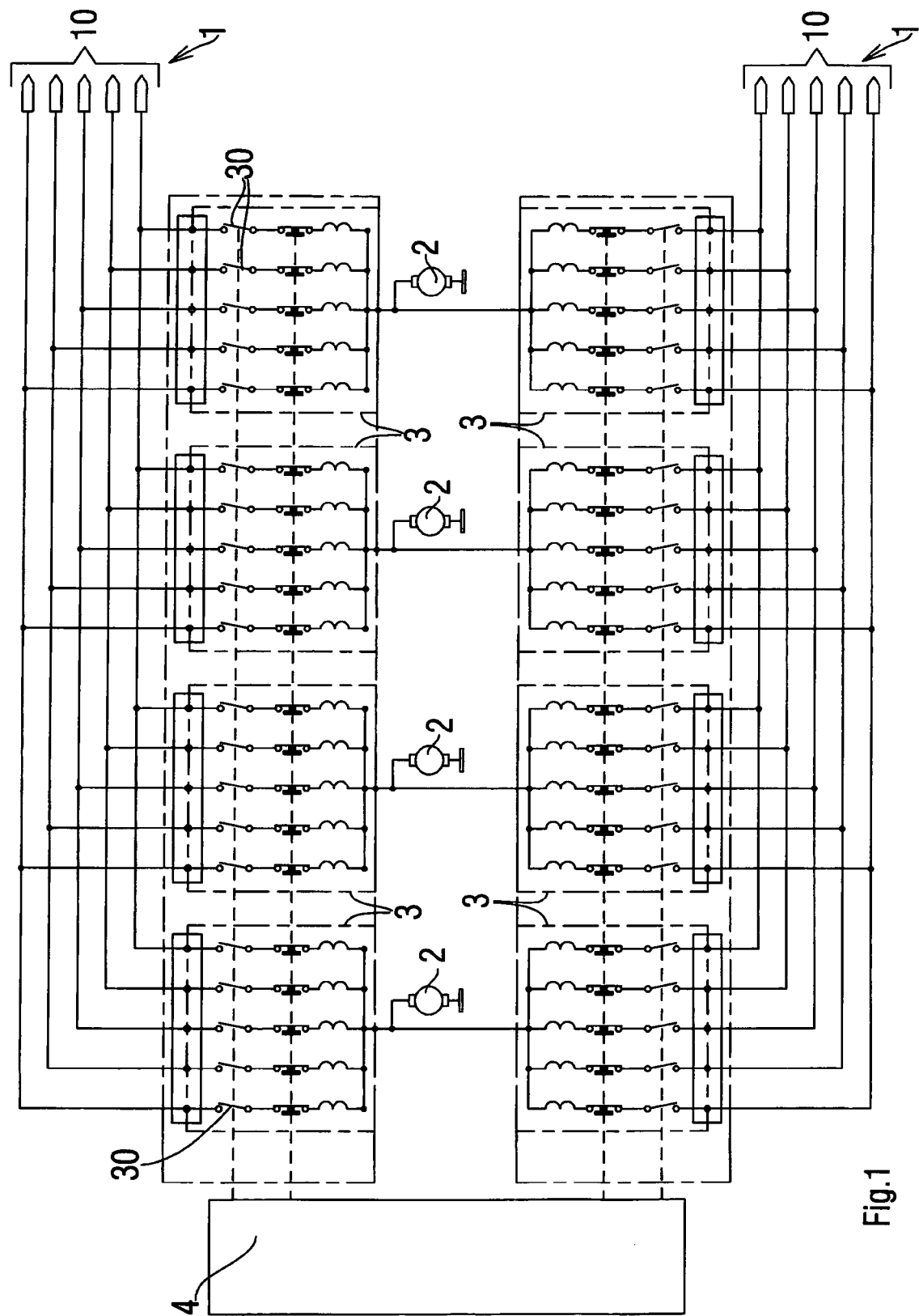

METHOD FOR ORGANISING AN ELECTRIC NETWORK INCLUDING A PLURALITY OF GENERATORS, DISTRIBUTION BLOCK AND EQUIPMENT

TECHNICAL FIELD

This invention relates to processes and means used to supply electricity to several electrical loads through a network, for example a network for confined environments such as described in the patent application that was filed on the same date by the applicant for "New electrical network architecture for confined environments incorporating electric power sources."

In the following specification, a generator is defined as an electric power source, thus one phase of a single-phase or multiphase electric power source can be integrated into what follows a generator.

PRIOR ART

Typically, known electrical networks for aircraft and others are each organized in a tree configuration so that each electrical load is connected to an electric power source by several electrical conductors arranged in series, forming for example, starting from the electric power source, a busbar, an arm or sub-busbar and a branch R, and these different busbars or sub-busbars can be made redundant for safety reasons.

DESCRIPTION OF THE INVENTION

Technical Problem

Currently, the devices used in case of power supply interruption are most often based on safety systems (inverters, for example) that take the relay of the electric power supply in the case of its failure or shutdown, or even power supply redundancies for critical loads such as the devices that are described in patent FR 2 911 847 A (Hispano Suiza). Devices containing more than two generators able to equitably distribute all the subnetworks existing between the available generators no matter what the number of generators that have failed or that have been assessed to be unavailable are unknown. The tendency is to limit the number of reassignments of subnetworks in such a way that only the subnetworks connected to one or more generators that become unavailable are reassigned to the available generators.

The sole object of patent FR 2 844 401 A (Electricite de France [FR]) dated Mar. 12, 2004 is to assure power transfer from a distribution network to three independent incoming lines onto two outgoing lines and not to equitably distribute the outgoing lines onto the incoming lines of the distribution network because by definition it would then be necessary to have at least three outgoing lines with three incoming lines for each of the incoming lines to deliver the same amount of power.

Technical Solution

The object of this invention is to solve the aforementioned problem by proposing a process and means of power supply and distribution allowing distribution of the energy of several sources on a network while ensuring the continuity of power supply in the case of a failure or interruption of one of the sources. Said sources being distributed, in case of a failure or nonavailability of one or more of them, to the subnetworks as a whole which must be protected.

For this purpose, the process according to the invention for organizing an electrical network divided into subnetworks and using several generators that are distinct from one another, is characterized in that it consists in:
   Establishing combinations defining the order of use of the generators depending on their availability,
   Characterizing each subnetwork by one of these particular combinations,
   Supplying each subnetwork by the first available generator according to the order of the combination.

Thus, if the generator of rank 1 of the combination or first generator is failing, the generator of rank 2 will take the relay to supply the corresponding subnetwork and if the generator of rank 2 is unavailable the generator of rank 3 will take the relay and so forth.

These combinations (at a maximum number of n factorial for n generators) make it possible to distribute the loads of an unavailable generator onto the other generators in an equitable manner provided that the loads assigned to each subnetwork have comparable power consumptions.

According to another characteristic of the invention, the process of electric power supply of a network divided into subnetworks and using several generators that are distinct from one another is characterized in that it consists in:
   Equitably sharing the subnetworks as a whole among the available generators according to combinations defining the order of use of the generators according to their availability,
   Characterizing each subnetwork by one of these particular combinations,
   Supplying each subnetwork by the first available generator according to the order of the combination,
   Only the subnetworks connected to one or more generators that become unavailable are reassigned.

The invention also has as its object an installation for using the process according to the invention.

This installation according to the invention comprises:
   At least one network divided into subnetworks,
   Several generators that are distinct from one another,
   Several means of selection that are able to assign at least one of the available generators to at least one subnetwork,
   A means of control and management acting on the selection means to select the generator.

The control means with respect to the actuation of the selection means calls on network pre-characterization tables. It is possible to assign certain parts of the network to particular combinations drawn from these tables. It will thus be possible to balance the network and the generators and to implement segregation between the different parts of the network.

Moreover, if the network comprises generators of different powers the number of cables of different subnetworks can be weighted by the power ratios of the different generators.

The invention likewise relates to a distribution block of automatically backed-up electric power sources.

This distribution block is characterized essentially in that it comprises several changeover switches, each comprising an output, a first input and a second input, said changeover switches being cascaded according to a predetermined order and able to be each connected to a dedicated generator, said output of each changeover switch being designed to be connected to one of the subnetworks of a network, the first input being connected onto the linked generator and the second input being connected to the output of the following changeover switch in the order of the cascade, the output of the changeover switch being switched either onto the first input when the generator is made available, or onto the second input in the opposite case.

Each changeover switch can be connected by its output to a subnetwork, and the various subnetworks that are linked to the distribution block are supplied with power by the different generators. The order in which the generators can be permutated is determined by the order in which the changeover switches are cascaded. If at this point one of the generators is made unavailable, for example as a result of a failure, the linked changeover switch withdraws this generator from the initial ordered series by connecting its output to another changeover switch via its second input. In this way the continuity of supply of the subnetwork linked to the failed generator is assured to the last available generator in its ordered series.

According to another characteristic of the invention the second input of at least one of the changeover switches is connected to the output of a preceding changeover switch in the order of the cascade.

According to another characteristic of the invention, the second input of the last changeover switch in the order of the cascade is connected to the output of the first changeover switch in the order of the cascade, forming a circular permutation order.

According to another characteristic of the invention, the second input of the last changeover switch in the order of the cascade is connected to the output of a changeover switch other than the first in the order of the cascade.

Thus, incomplete combinations that can satisfy the particular conditions of use are implemented. It is thus that the suppression of one changeover switch and of the linked generator in one of the groups of circular permutations leads to the power cutoff of all the subnetworks linked to the other changeover switches of this group when the remaining generators as a whole are unavailable.

Likewise, the insertion of a changeover switch and its generator into a permutation group allows the subnetwork of this same group and only it to be able to be supplied by this generator. Thus a safety function for critical loads can be implemented.

It will be equally possible to electrically introduce a changeover switch linked to an electric power source between an output of the distribution block and the corresponding subnetwork. This arrangement by one actuation will make it possible to supply this subnetwork no longer from the corresponding output of the distribution block, but directly from this source that can consist of a generator or else by another of the outputs of the distribution block.

According to another characteristic of the invention, the second input of the last changeover switch in the order of the cascade is connected to the output of a switch that is other than the first in the order of the cascade.

According to another characteristic of the invention, the set of all the possible circular permutations provides all possible permutations.

Thus, a complete distribution block is produced based on the set of circular permutation groups that correspond to the different generators. Each of the circular permutation groups can supply a number of different subnetworks equal to the number of generators used.

According to another characteristic of the invention, several changeover switches can be mechanically coupled to one another and utilize the same permutation command.

Such an arrangement makes it possible, among others, to utilize polyphase networks, for example three-phase networks.

Moreover, according to another characteristic of the invention, several dedicated changeover switches that are mechanically linked to one another, utilizing the same permutation command, are linked to each generator.

This arrangement makes it possible to reduce the number of electromechanical permutation components.

The distribution block such as described is advantageously used for electric power supply of an installation.

This installation comprises a network that is divided into subnetworks and is noteworthy especially in that the outputs of the distribution block are each connected to a dedicated subnetwork, which comprises at least one electrical conductor.

SUMMARY DESCRIPTION OF THE FIGURES AND DRAWINGS

Figure 2:
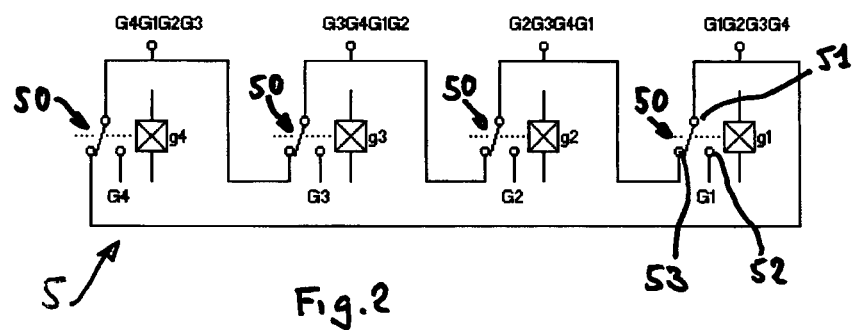
Figure 3:
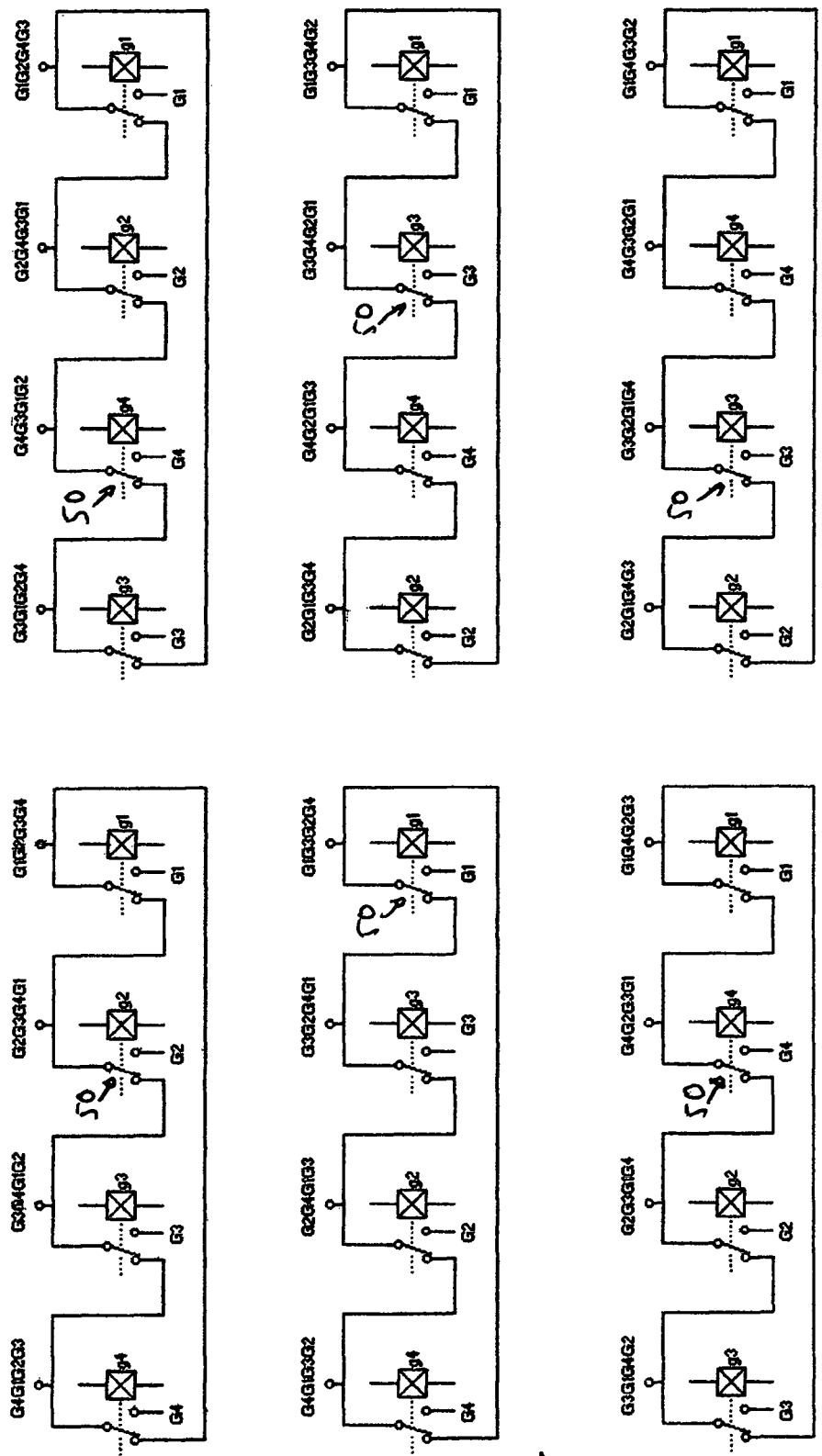
Figure 4:
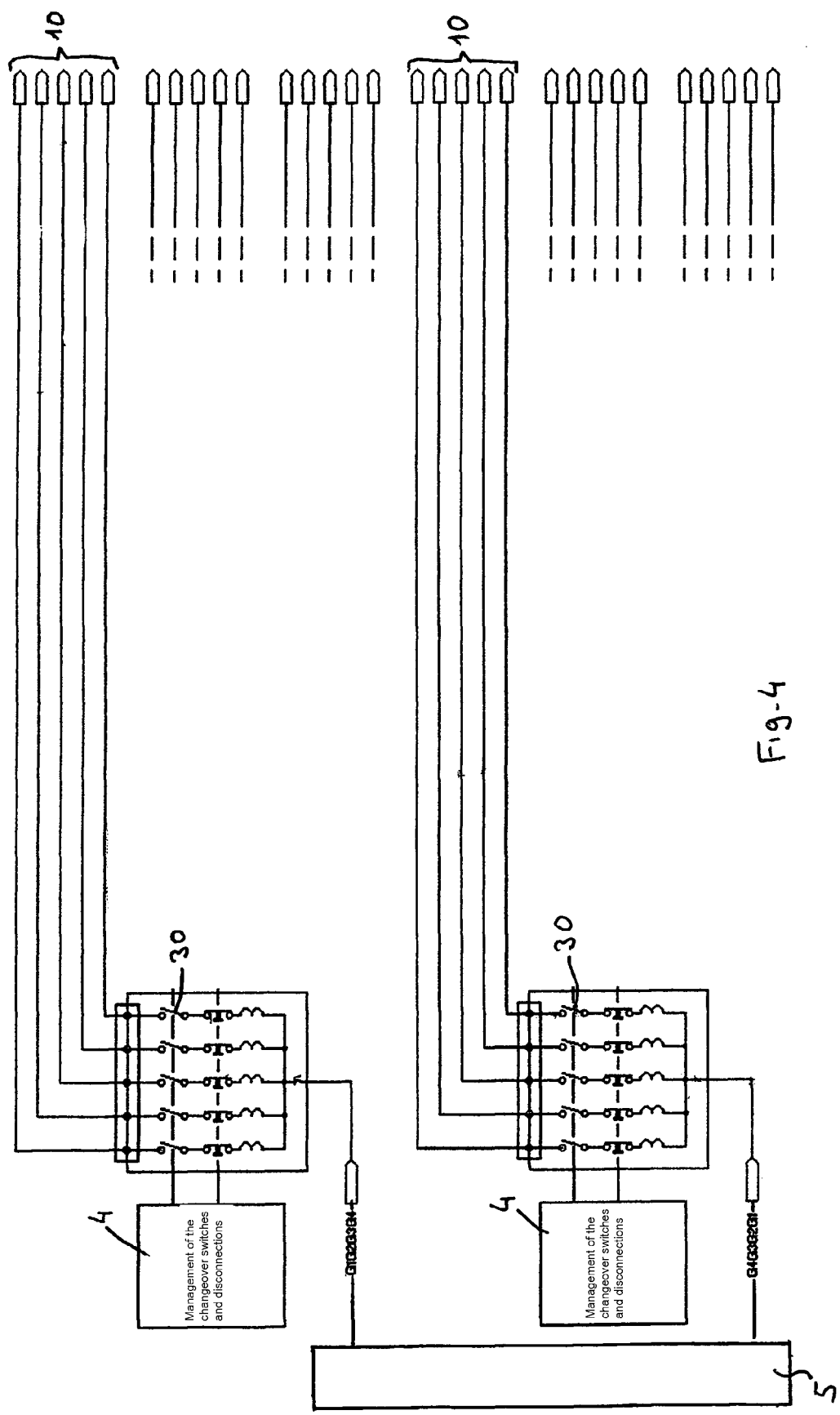
Figure 5:
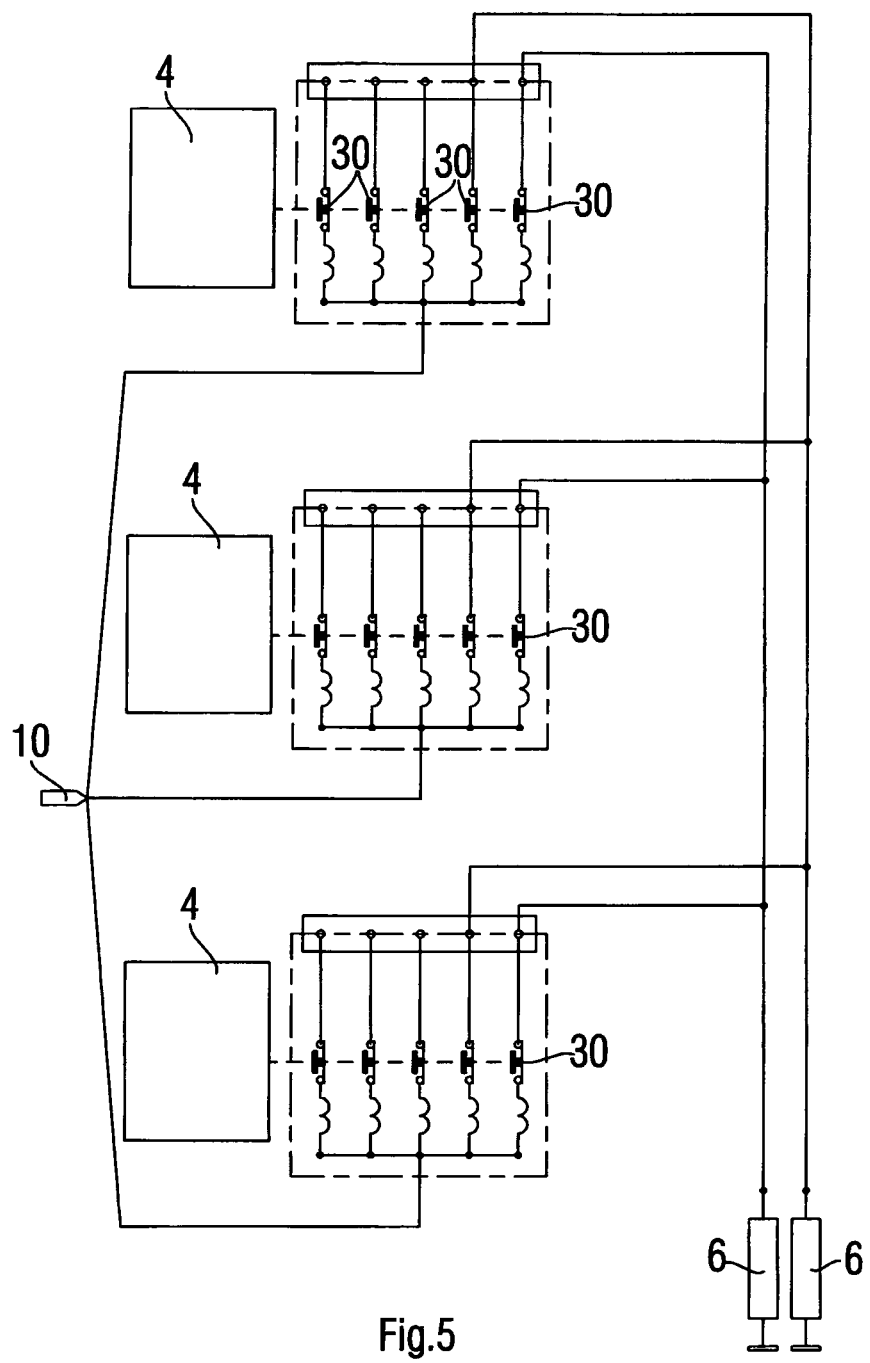

Other advantages and characteristics of the invention will become apparent from reading the description of a preferred embodiment given as a nonlimiting example with reference to the attached drawings in which:

FIG. 1 is a schematic view of an installation for implementing the process according to the invention, FIG. 2 is a schematic view of a distribution block according to the invention, FIG. 3 is a schematic view of a complete distribution block, i.e., that has all possible permutations, FIG. 4 is a schematic view of an installation implementing a distribution block according to the invention, FIG. 5 is a schematic view of a power supply mode of a load by two mirror permutation groups, FIG. 6 is a view of a power supply mode of several loads based on a segmental circuit breaker.

OPTIMUM IMPLEMENTATION OF THE INVENTION

FIG. 1 shows an installation for implementing the process according to the invention. This installation is, for example, the one described in the patent application that was filed on this same date by the applicant for a new electrical network architecture for confined environments incorporating electric power sources.

This installation comprises a wire network of one or more conductors, several generators 2 that are distinct from one another, a selection means 3 that is able to assign at least one of the available generators 2 to at least one of the conductors, and a means of control and management 4 acting on the selection means 3 for connecting the generators to the conductors.

Preferably, in the embodiment of FIG. 1, this network is divided by configuration into subnetworks by the means of control and management. It is possible to make a physical division of the network into subnetworks, which makes it possible to obtain a segregation of the different subnetworks.

Each selection means is composed of interruption elements 30, each with one input and one output. FIG. 1 shows that the inputs of the interruption elements 30 of each selection means are connected to one another and to a dedicated generator 2. It is likewise shown on this figure that the output of each interruption element is connected to one of the network conductors.

It is also apparent that each conductor is connected as much to the interruption element as the linked generators.

The interruption elements 30 can be remotely activated in the direction of opening or closing by an optical or electrical signal supplied by the control and management means 4. This control and management means, by acting on the interruption elements 30, assures the distribution of the electric power onto each of the conductors of the network according to a table of assignment of these conductors to subnetworks according to the state of availability of the generators. These tables according to the process according to the invention relate to various predefined combinations of the order of use.

Each subnetwork is thus characterized by a particular combination in the order of substitution of the generators 2.

It goes without saying that each interruption element comprises in series a protection means, this protection means being able to comprise or to consist of a fuse element of suitable size.

The protection and selection means can comprise or can be composed of one segmental circuit breaker or breakers arranged in parallel such as described in the patent application that was filed on the same date by the applicant for "Segmental electronic circuit breaker and system comprising it."

This system comprises means of protection against short circuits between generators. These means of protection are advantageously composed of protection means of the interruption elements.

Active protection can use the interruption element.

FIG. 2 schematically shows a distribution block linked to four generators. This figure shows that the distribution block comprises several changeover switches 50, each comprising an output 51, a first input 52 and a second input 53. These changeover switches are cascaded according to a predetermined order and can each be linked to a dedicated generator 2.

The output 51 of each switch is designed to be connected to one of the established subnetworks 10. The first input 52 is connected to the linked generator 2 and the second input 53 is connected to the output 51 of the changeover switch 50 that follows in the order of the cascade.

The output 51 of each changeover switch is switched either onto its first input when the linked generator is made available or onto the second input in the opposite case.

It is likewise apparent that the second input of the last changeover switch 50 in the order of the cascade is connected to the output of the first changeover switch 50 in the order of the cascade, thus forming a ring defining a circular permutation order.

Each subnetwork 10 linked to the distribution block is connected only to one generator at most at the same time under any circumstances. Each subnetwork 10 is designed only to be connected to a single output of the distribution block.

FIG. 3 shows a complete distribution block for four generators. This figure illustrates that the changeover switches are arranged in several cascades of four elements and that the number of cascades is equal to the six possible circular permutations. Thus, 24 different outputs corresponding to the 24 possible permutations in the order of the generators 2 are obtained.

Thus, if the example of four balanced generators that will be called G1, G2, G3 and G4 is taken, the number of permutations is 24 (=4!). A subnetwork 10 can thus be supplied according to the sequence G1, G2, G3 and G4, another according to the sequence G1, G2, G4 and G3 and so forth.

The indicated sequences Gx, Gy, Gz, Gt are given below for this example.
G1 G2 G3 G4 G1 G2 G4 G3 G1 G3 G2 G4 G1 G3 G4 G2 G1
G4 G2 G3 G1 G4 G3 G2 G2 G1 G3 G4 G2 G1 G4 G3 G2 G3
G1 G4 G2 G3 G4 G1 G2 G4 G1 G3 G2 G4 G3 G1 G3 G1 G2
G4 G3 G1 G4 G2 G3 G2 G1 G4 G3 G2 G4 G1 G3 G4 G1 G2
G3 G4 G2 G1 G4 G1 G2 G3 G4 G1 G3 G2 G4 G2 G1 G3 G4
G2 G3 G1 G4 G3 G1 G2 G4 G3 G2 G1

If a subnetwork that obeys the permutation G3 G2 G4 G1 is taken, this means that this subnetwork is supplied on a priority basis by the generator G3. If it has failed, then this subnetwork will be supplied by the generator G2. If the generator G2 is no longer functioning either, then the subnetwork will be supplied by the generator G4, and finally, if no other is functioning, it will be supplied by the generator G1.

The importance of this subdivision of the network is the following: each time that one or more generators have malfunctioned, the remaining generators equitably share the network.

In the preceding example with 4 generators, if G2 has failed for example, it is apparent that the preceding sequences become:
G1-G3 G4 G1-G4 G3 G1 G3-G4 G1 G3 G4- G1 G4-G3 G1
G4 G3 -G1 G3 G4 -G1 G4 G3 -G3 G1 G4 -G3 G4 G1 -G4 G1
G3 -G4 G3 G1 G3 G1-G4 G3 G1 G4- G3-G1 G4 G3-G4 G1
G3 G4 G1- G3 G4-G1 G4 G1-G3 G4 G1 G3- G4-G1 G3
G4-G3 G1 G4 G3 G1- G4 G3-G1

All the networks of the second line that were supplied by G2 are now supplied by the other generators. There were previously 6 subnetworks per generator out of the 24, there are now 8 per generator. If a second generator fails, for example G3, the following sequence is obtained:
G1--G4 G1-G4- G1--G4 G1-G4- G1 G4-- G1 G4-- -G1-G4
-G1 G4- --G1 G4 --G4 G1 -G4 G1- -G4-G1 -G1-G4 -G1 G4-
--G1 G4 --G4 G1 -G4 G1- -G4-G1 G4 G1-- G4 G1-- G4-G1-
G4--G1 G4-G1- G4--G1

It is apparent that the subnetworks represented by the permutations of the third line are no longer connected to the generator G3, but to the first of line (G1 or G4), this is equally true for the second line when the generator G3 had replaced the generator G2. It is now apparent that there are 12 branches connected to G1 and 12 to G4.

Finally, if one of the two remaining generators fails, the other will take over on the whole of the network.

Advantageously all the changeover switches 50 linked to the same generator 2 are mechanically coupled to one another and utilize the same permutation command. Thus the number of electromechanical components is reduced to four, each of these components being composed of six changeover switches 50 that are activated by the same motor element.

Each changeover switch 50 can be composed of two single contact-type relays, two RCCB (remotely controlled circuit breaker) or other equivalent circuits or functions.

FIG. 4 shows an installation using a distribution block according to the invention and a multiwire network.

This installation comprises an electrical network 1 divided into subnetworks. It will be possible to maintain only a single protection for each of the conductors of each subnetwork provided that each conductor can be connected only to a single output of the distribution block since the distribution block performs the function of generator selection.

This installation comprises an interruption element 30 with one input and one output, this interruption element being connected by its input to the corresponding output of the distribution block and by its output to the electrical conductor of this subnetwork.

In the example of FIG. 4, each subnetwork 10 comprises several electrical conductors and several interruption elements 30 that are connected solely by their outputs, respectively to each of the conductors of the subnetwork 10, these interruption elements being connected by their inputs to the same corresponding output of the distribution block.

FIG. 4 shows two subnetworks 10, each composed in a nonlimiting way of five electrical conductors, these subnetworks being connected for the one to one of the outputs of the distribution block and for the other to another output of this distribution block. These two subnetworks are supplied by two different outputs of the distribution block.

Each interruption element 30 can be remotely controlled in the direction of opening and closing by a control and management means 4 that is able to manage especially the switchings and disconnections.

The installation according to the invention such as is shown in FIG. 5 comprises at least one output terminal designed to receive an electrical load 6, to which terminal there is connected at least one interruption element 30 that is connected to one of the conductors of a subnetwork. This interruption element 30 is likewise able to be remotely controlled in the direction of opening or closing by the control and management means 4.

In the practical embodiment, several interruption elements 30 are connected to the output terminal and these interruption elements 30 are connected to different conductors of the same subnetwork 10.

The interruption elements 30 linked to the output terminal on which a load 6 can be connected can be comprised, as can be seen in this FIG. 5, of elementary circuit breakers of the segmental circuit breaker such as is described in the patent application that was filed on this same date by the same applicant for "Segmental electronic circuit breaker and system comprising it." Each load is thus connected to a distributed circuit breaker based on a set of segmental circuit breakers that are connected to the same subnetwork.

In FIG. 6, the output terminal that is designed to receive a load 6 is connected to two subnetworks 10 selected by distributed circuit breakers, each connected to a different subnetwork.

This configuration makes it possible to modify the assignment of the loads between the subnetworks, which yields the flexibility for balancing of the network.

Advantageously, the same load 6 can be supplied by two subnetworks, of which the permutation order of one is the mirror of the permutation order of the other. Thus, in the case of four generators G1, G2, G3, G4, the permutation order G1-G2-G3-G4 can correspond to one of the subnetworks, whereas then the mirror permutation order, i.e., G4-G3-G2-G1 will correspond to the other subnetwork. Under these conditions, the load 6 is supplied by one of the permutation groups, but in case of failure of one or more generators it will be able to be tripped to the active generator of the other permutation group. Actually, whatever the failing generators, this arrangement makes it possible to select different generators by permuting from one subnetwork to the other as long as there is more than one generator functioning.

In this FIG. 6, the output terminal that is dedicated to the load 6 is connected to two subnetworks corresponding to two mirror permutation orders, the interruption elements 30 of each subnetwork that are linked to the supply conductors of the load are distributed on several segments of the circuit breaker, which is described in the patent application that was filed on this same date by the same applicant for "Segmental electronic circuit breaker and installation comprising it."

In case it is desired to increase the number of circuit breakers distributed by load, care will be taken, regardless of the failing generators, that there be at least one opportunity to connect the load of one available generator to another available generator up to the last one.

It goes without saying that one fuse element will be series-connected to each interruption element. Likewise, each interruption element 30 as just described acts as a circuit breaker and as a relay.

The various installations as described are designed for confined environments such as aircraft and others.

This invention is not limited to the embodiments that have just been described, but on the contrary, encompasses the variants of implementation.

The invention claimed is:

1. A process for distribution of electric power in a network, the process comprising:
dividing the network into subnetworks in which network n generators, n being greater than or equal to three, supply the network when said generators are available, in which network each subnetwork is supplied at a given time given only by a single generator;
establishing for the network a table of combinations of n factorial possible combinations, each of the combinations in the table of combinations defining a different order of use of the plurality of generators according to their availabilities;
characterizing, with a means of control and management, each of the subnetworks by one of said combinations;
assigning, with selection means controlled by the means of control and management, each of the subnetworks the first available generator according to the order of use of the combination that characterizes the subnetwork under consideration; and
when a generator becomes unavailable, equitably distributing the subnetworks supplied by said generator before its nonavailability among the generators that are still available.

2. The process for distribution of electric power according to claim 1, wherein when all the generators are available, each generator supplies a plurality of the subnetworks in a balanced manner.

3. The process for distribution of electric power according to claim 2, wherein at least n factorial subnetworks are supplied so that at least one said subnetwork is assigned to each of the possible combinations.

4. The process for distribution of electric power according to claim 1, wherein the subnetworks are linked to combinations in which one generator is suppressed so that when all the other generators of said combinations are unavailable, said subnetworks are cut off from the network.

5. The process for distribution of electric power according to claim 1, wherein one said generator is linked to a safety function by being incorporated into the only combinations linked to the subnetworks whose supply must be assured by said generator in emergency mode.

6. The process for distribution of electric power according to claim 1, wherein two said subnetworks of the network that are intended to supply at least the same load that can be permutated equally on one or the other of said two subnetworks, are characterized by mirror combinations of the order of use of the generators so that said two subnetworks are supplied by different said generators as long as more than one said generator, whose order of use is defined by said mirror combinations, are available.

7. An electric power distribution installation comprising:
a network divided into several electrically independent subnetworks, each said subnetwork comprising selection means;
several generators that are distinct from one another, wherein the selection means of a respective said subnetwork are able to connect the generators according to the combination characterizing said subnetwork; and means of control and management acting on the selection means for selecting the available generator that must supply the subnetwork of the respective selection means, wherein the network is arranged to establish a table of combinations of n factorial possible combinations, each of the combinations in the table of combinations defining a different order of use of the plurality of generators according to their availabilities, to characterize each of the subnetworks by one of said combinations, to assign each of the subnetworks the first available generator according to the order of use of the combination that characterizes the subnetwork under consideration and when a generator becomes unavailable, to equitably distribute the subnetworks supplied by said generator before its nonavailability among the generators that are still available.

8. The installation according to claim 7, further comprising means of protection against short circuits between respective said generators.

9. The installation according to claim 8, wherein the installation equips a confined environment.

10. The installation according to claim 7, wherein the installation equips a confined environment.

11. An aircraft comprising an installation according to claim 7.

* * * * *